United States Patent
Chan et al.

(10) Patent No.: US 7,984,908 B2
(45) Date of Patent: Jul. 26, 2011

(54) DOCUMENT FEEDING DEVICE FOR HANDLING AND REVERTING DOUBLE-SIDED DOCUMENT SHEETS TO AN ORIGINAL SEQUENCE

(75) Inventors: Hsun-Hao Chan, Taichung (TW); Kung-Hsin Teng, Taichung (TW); Hsien-Chi Lin, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 12/774,209

(22) Filed: May 5, 2010

(65) Prior Publication Data

US 2010/0283196 A1 Nov. 11, 2010

(30) Foreign Application Priority Data

May 11, 2009 (TW) ................................ 98115543 A

(51) Int. Cl.
*B65H 39/10* (2006.01)
*G03G 15/00* (2006.01)
(52) U.S. Cl. ............ 271/291; 271/65; 271/186; 399/374
(58) Field of Classification Search ................ 271/3.14, 271/65, 291, 186; 399/374
See application file for complete search history.

(56) References Cited

U.S. PATENT DOCUMENTS

| 7,578,504 | B2* | 8/2009 | Tsai et al. ................... 271/301 |
| 7,802,786 | B2* | 9/2010 | Tsai et al. ................... 271/186 |
| 7,946,578 | B2* | 5/2011 | Hatayama et al. ............ 271/186 |
| 2004/0140606 | A1* | 7/2004 | Kobayashi et al. .......... 271/4.01 |
| 2008/0067736 | A1* | 3/2008 | Tsai et al. ................... 271/186 |
| 2008/0179822 | A1* | 7/2008 | Tu ............................. 271/186 |
| 2008/0226369 | A1* | 9/2008 | Park et al. ................... 399/374 |
| 2009/0074490 | A1* | 3/2009 | Shoji et al. .................. 399/374 |

* cited by examiner

*Primary Examiner* — David H Bollinger
(74) *Attorney, Agent, or Firm* — Thomas|Kayden

(57) ABSTRACT

A document feeding device for handling and reverting double-sided document sheets to an original sequence is provided, including a housing unit and a switching unit. The housing unit includes a delivery passage, a flipping passage, a bypass area, a return passage and upper and lower turning passages. The switching unit, pivotally disposed in the bypass area, includes a first switching member, a second switching member connecting to a side of the first switching member, and a guiding passage between the first switching member and the second switching member. The switching unit switches between a first position and a second position. By the switching of the switching unit, the double-sided document is flipped, scanned and reverted to an original sequence.

7 Claims, 6 Drawing Sheets

DOCUMENT FEEDING DEVICE FOR HANDLING AND REVERTING DOUBLE-SIDED DOCUMENT SHEETS TO AN ORIGINAL SEQUENCE

This Application claims priority of Taiwan Patent Application No. 098115543, filed on May 11, 2009, the entirety of which is incorporated by reference herein.

BACKGROUND OF THE INVENTION

1. Field of the Invention

The invention relates to a multi-function printer, and in particular, a multi-function printer comprising a document feeding device for handling and reverting double-sided document sheets to an original sequence.

2. Description of the Related Art

As shown in FIG. 1, a conventional double-sided document feeding device (TW 095136895) is provided. The double-sided document feeding device comprises a housing unit 1 and a switching unit 2. The housing unit 1 comprises a delivery passage 101, a flipping passage 102 connected to the delivery passage 101 and a return passage 103 on a side of the delivery passage 101 and the flipping passage. The switching unit 2, pivotally disposed in the return passage 103, comprises a first switching member 201, a second switching member 202 connected to a side of the first switching member 201 and a guiding passage 203 between the first and second switching members 201, 202. When the switching unit 2 is in a first position, the first switching member 201 is mounted to allow communication between the delivery passage 101 and the return passage 103, and a first surface of the document sheet is therefore scanned. When the switching unit 2 is in a second position, the flipping passage 102 and the guiding passage 203 are communicated to flip the document sheet over, and a second surface of the document sheet is therefore scanned. When the switching unit 2 is in a third position, the delivery passage 101 and the guiding passage 203 are disconnected in order to send out the document through the flipping passage 102 and the delivery passage 101, after the first surface and the second surface of the document have been scanned.

The double-sided document feeding device utilizes the switching of the switching unit 2 to flip and scan the double-sided document sheets and revert the document sheets to an original sequence. However, the flipping passage 102 and the delivery passage 101 are required in order to revert the document sheet to an original sequence. As a result, the previous document sheet of the document must be completely ejected from the delivery passage 1, and the switching unit 2 must return from the third position to the first position, and the next document sheet of the document is then be able to be scanned. Thus, it slows down the scanning speed of the conventional double-sided document feeding device.

BRIEF SUMMARY OF THE INVENTION

Accordingly, the objective of the invention is to provide a speedy document feeding device for handling and reverting double-sided document sheets to an original sequence, without a dramatic increase in size.

The document feeding device for handling and reverting double-sided document sheets to an original sequence of the invention comprise a housing unit and a switching unit. The housing unit comprises a delivery passage, a flipping passage connected to the delivery passage, a bypass area on a side of the delivery passage and the flipping passage, a return passage on a side of the bypass area, an upper turning passage and a lower turning passage. The delivery passage has a feeding end, an exhausting end below the feeding end and a scanning section between the feeding end and the exhausting end. The flipping passage has a guiding inlet corresponding to the exhausting end and a guiding outlet connected to the delivery passage. The return passage has an inner end corresponding to the guiding inlet and an outer end opposite to the inner end. The upper turning passage, adjacent to a side of the bypass area, has a first internal end corresponding to the exhausting end and a first external end opposite to the first internal end. The lower turning passage has a second external end corresponding to the first external end and a second internal end opposite to the second external end. The switching unit, pivotally disposed in the bypass area, comprises a first switching member, a second switching member connecting to a side of the first switching member and a guiding passage between the first switching member and the second switching member. The second switching member has a curved guiding surface opposite to the guiding passage. When the switching unit is in a first position, the first switching member is mounted to allow communication between the exhausting end and the return passage, the second switching member moves close to the upper and lower turning passages, and the curved guiding surface is located between first and the second internal ends to form a curving path communicating the upper turning passage with the lower turning passage. When the switching unit is in a second position, the first switching member is mounted to allow communication between the guiding inlet and the return passage, and the second switching is mounted to allow communication between the exhausting end and the upper turning passage.

The invention provides scanning of document sheets without completely ejecting a previous sheet of the document by separating the upper and lower turning passages with the delivery passage and the flipping passage. Thus, scanning speed is quickened and the overall size of the document feeding device is not increased due to the small-sized upper and lower turning passages.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
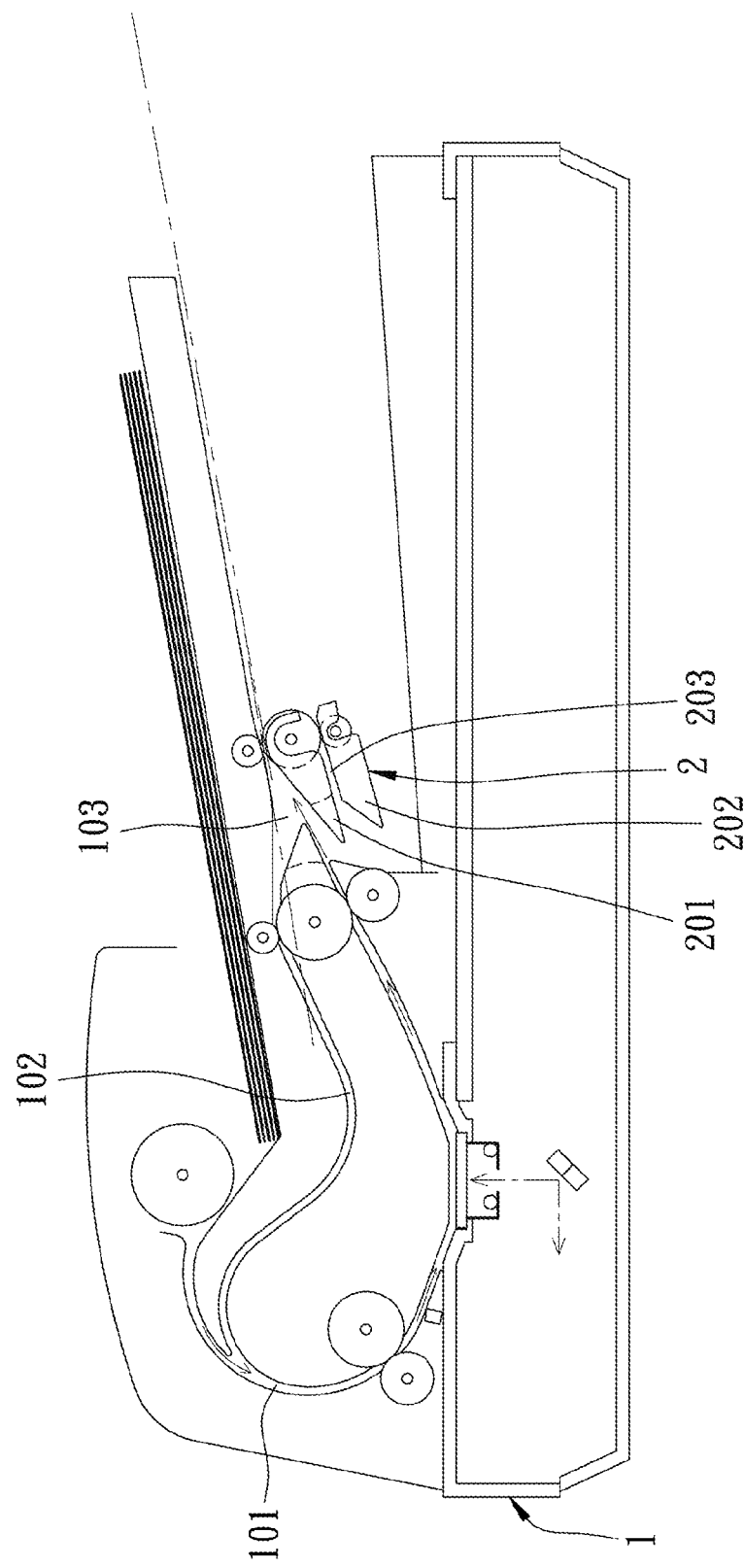
FIG. 1 is a schematic view of a conventional double-sided document feeding device.
Figure 2:
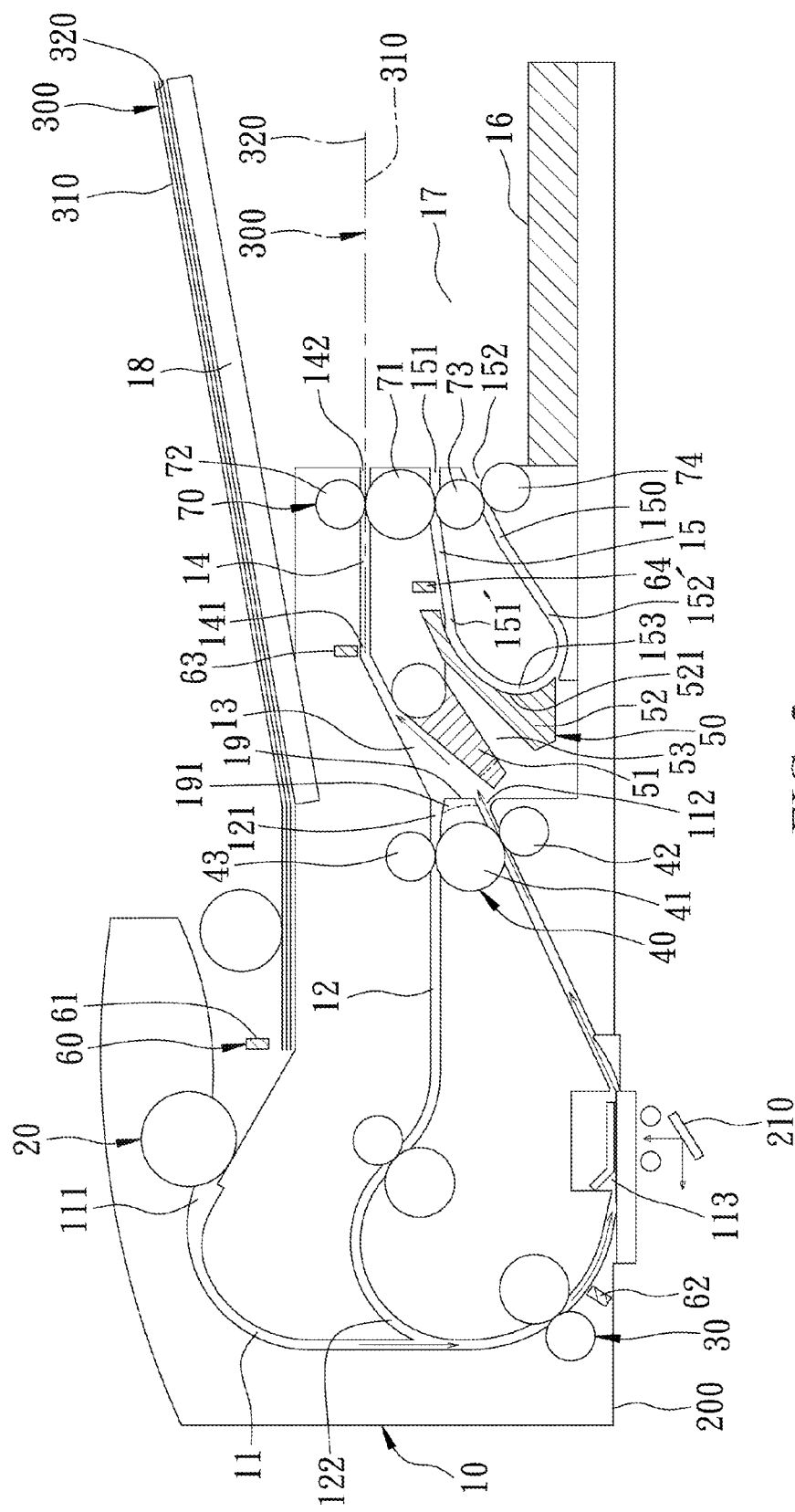
FIG. 2 is a sectional view of a document feeding device for handling and reverting double-sided document sheets to an original sequence according to an embodiment of the invention.

FIG. 2 shows a preferred embodiment of a document feeding device for handling and reverting double-sided document sheets to an original sequence. The document feeding device is applied on an image forming apparatus 200 (such as a copy machine or a scanner) for automatic delivery and duplex scanning of a document 300 having a first surface 310 and a second surface 320. The image forming apparatus 200 has a scanning unit 210. The document feeding device comprises a housing unit 10, a feeding roller assembly 20 assembled in the interior of the housing unit 10, a moving roller assembly 30, a exhausting roller assembly 40, a switching unit 50 assembled on outer side of the exhausting roller assembly 40, a sensing unit 60 and a return roller assembly 70 on outer side of the switching unit 50.

The housing unit 10 comprises a C-shaped delivery passage 11, a flipping passage 12 connected to the delivery passage 11, a bypass area 13 on a side of the delivery passage 11 and the flipping passage 12, a return passage 14 on outer side of the bypass area 13, an upper turning passage 15 below the return passage 14 and on outer side of the bypass area 13, a lower turning passage 150 correspondingly disposed below the upper turning passage 15, an ejecting tray 16 on outer side of the upper and lower turning passages 15, 150, a return space 17 above the ejecting tray 16 and an feeding tray 18 corresponding to the delivery passage 11. The delivery passage 11 has a feeding end 111, an exhausting end 112 below the feeding end 111 and a scanning section 113. The flipping passage 12 has a guiding inlet 121 corresponding to the exhausting end 112 and a guiding outlet 112 connected to the delivery passage 11. The bypass area 13 communicates the exhausting end 112 with the guiding inlet 121. The return passage 14 has an inner end 141 corresponding to the guiding inlet 121 and an outer end 142 opposite to the inner end 141 and communicating with the return space 17. The upper turning passage 15, adjacent to the bypass area 13, has a first internal end 151' corresponding to the exhausting end 112 and a first external end 151 opposite to the first internal end 151'. The lower turning passage 150 has a second external end 152 corresponding to the first external end 151 and a second internal end 152' opposite to the second external end 152. The scanning unit 210 is located in the scanning section 13 between the guiding outlet 122 and the exhausting end 112, at the bottom of the housing unit 10. Additionally, the housing unit 10 further comprises a protruded trapezoid end portion 19 disposed between the guiding inlet 121 and the exhausting end 112. The end portion 19 is disposed in the bypass area 13 and comprises a plurality of guiding pieces 191.

The feeding roller assembly 20 is pivotally disposed between the feeding end 111 and the feeding tray 18.

The moving roller assembly 30 is pivotally disposed between the guiding outlet 122 and the scanning unit 210.

The exhausting roller assembly 40 comprises a first driving roller 41, a first driven roller 42 and a second driven roller 43. The first and second rollers 42, 43 are disposed on two sides of the first driving roller 41, and corresponding to the exhausting end 112 and the guiding inlet 121, respectively. The first and second driven rollers 42, 43 are driven by the first driving roller 41 to rotate relatively to the first driving roller 41.

Figure 3:
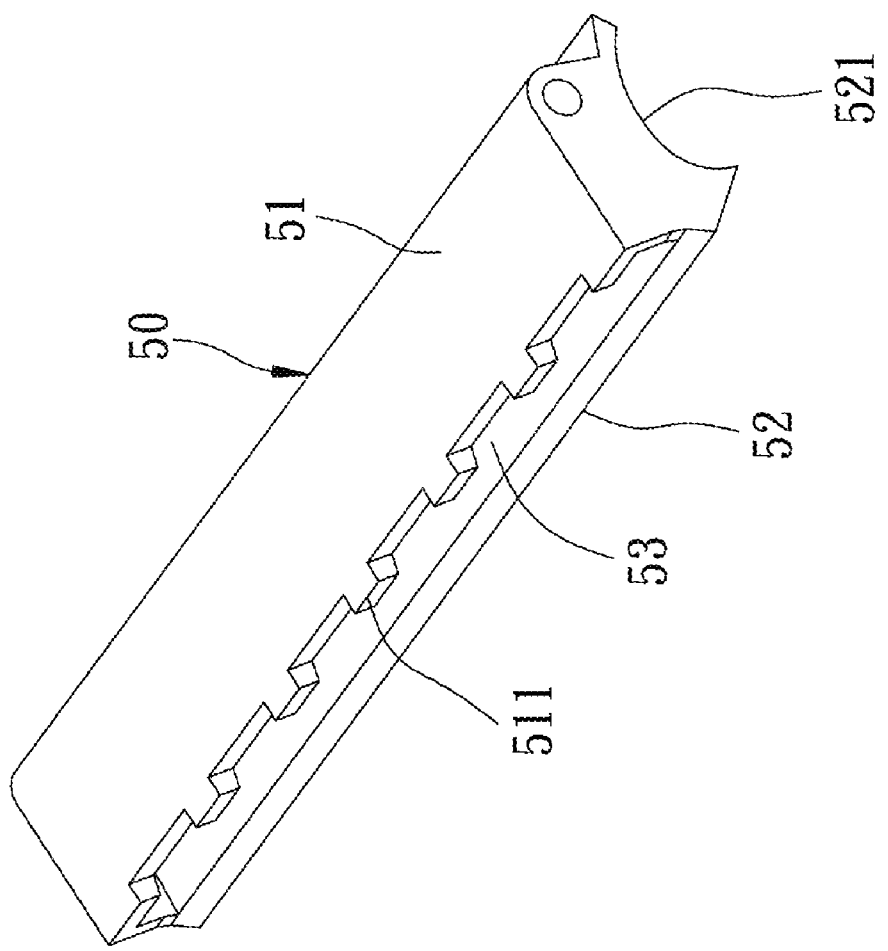
FIG. 3 is a schematic view of a switching unit according to the embodiment of the invention.
Figure 4:
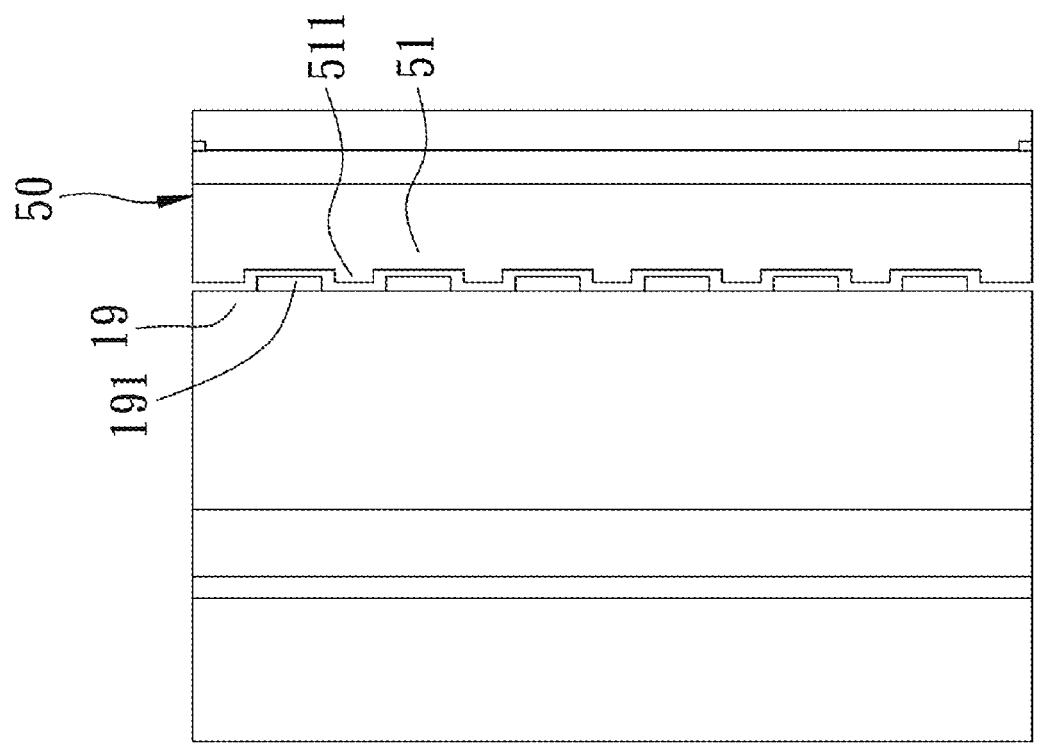
FIG. 4 is a schematic view showing the switching unit and an end portion according to the embodiment of the invention.

Referring to FIGS. 3 and 4, the switching unit 50, pivotally disposed in the bypass section 13, comprises a first switching member 51, a second switching member 52 connecting with a side of the first switching member 51 and a guiding passage 53 between the first and second switching members 51, 52. The first switching member 51 comprises a plurality of protrusions 511 disposed on the end thereof. The protrusions 511 and the guiding pieces 191 of the end portion 19 are alternately disposed to prevent interference during the rotation of the first switching member 51 relatively to the end portion 19. The second switching member 52 has a curved guiding surface 521 on the opposite side of the guiding passage 53. When the second switching member 52 moves close to the upper and lower turning passages 15, 150, the curved guiding surface 521 is disposed between and connects the first and second internal end 151', 152' to form a curving path 153 communicating the upper turning passage 15 with the lower turning passage 150.

The sensing unit 60 comprises a first sensing member 61 corresponding to the feeding roller assembly 20, a second sensing member 62 disposed between the moving roller assembly 30 and the scanning unit 210, a third sensing member 63 in the return passage 14 and a fourth sensing member 64 at the first internal end 151'.

The return roller assembly 70 comprises a second driving roller 71, an upper driven roller 72, a lower driven roller 73 and a guiding roller 74 corresponding to the lower driven roller 73. The upper and lower driven rollers 72, 73 are disposed on two sides of the second driving roller 71 and corresponding to the return passage 14 and the first external end 151, respectively. The upper and lower driven rollers 72, 73 are driven by the second driving roller 71 to rotate relatively to the second driving roller 71. The guiding roller 74 is indirectly driven by the second driving roller 71 to rotate relatively to the lower driven roller 73.

The following description depicts the operation of the previously described embodiment of the present invention:

As shown in FIG. 2, when the device is not in operation, the switching unit 50 is in the first position. That is, the first switching member 51 is mounted to allow communication between the exhausting end 112 and the return passage 14, the second switching member 52 is close to the upper and lower turning passages 15, 150, and the curved guiding surface 521 connects the first and second internal ends 151' 152' to form the curving path 153.

When sheets of a document 300 are to be double-sided scanned, they are arranged in sequence from top to bottom on the feeding tray 18. The first surface 310 of the document 300 is facing upward, and the second surface 320 of the document is facing downward. When the first sensing member 61 senses the front end of the document 300, the feeding roller assembly 20 is driven by a power source (not shown) to convey the first sheet of the document 300 into the delivery passage 11. Then, by utilizing the moving roller assembly 30, the sheet is continuously carried therein. When the second sensing member 62 senses the front end of the document 300 and the movement thereof is delayed for a period of time, the scanning unit 210 is activated to complete scanning of the first surface 310. At this time, by rotation of the exhausting roller assembly 40 and the communication between the exhausting end 112 and the return passage 14 by the first switching member 51, the scanned document 300 (as shown by dotted line in FIG. 2) from the delivery passage 11 is guided through the bypass area 13 to the return passage 14. Additionally, by rotation of the second driving roller 71 and the upper driven roller 72, the document 300 is moved toward the return space 17 with its first surface 310 facing downward and second surface 320 facing upward.

Figure 5:
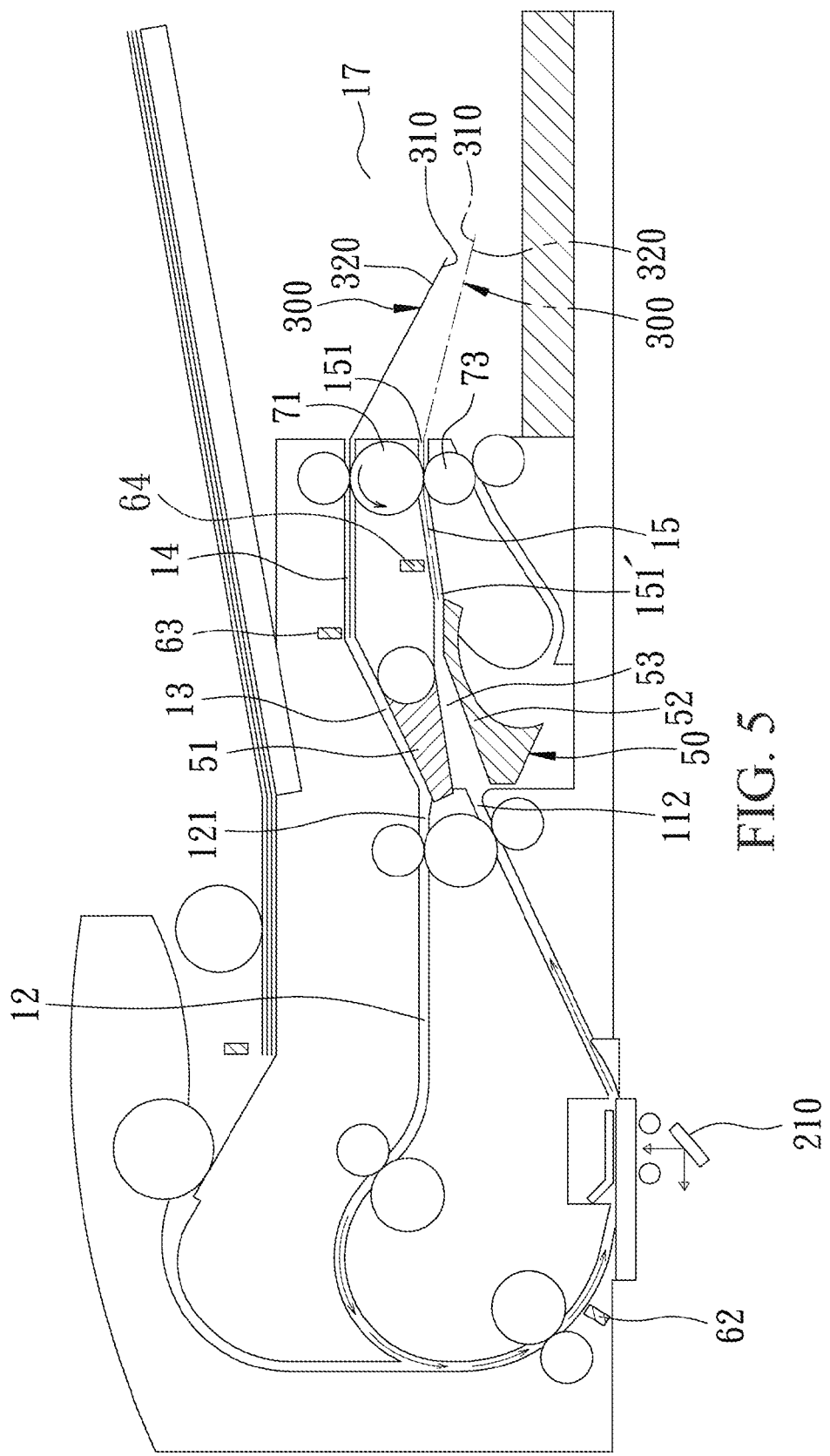
FIG. 5 is a schematic view of the switching unit showing the switching unit in a second position according to the embodiment of the invention.

Next, as shown in FIG. 5, when the third sensing member 63 senses the rear end of the document 300, the switching unit 50 is moved from the first position to the second position, the first switching member 51 is mounted to allow communication between the guiding inlet 121 and the return passage 14, and the second switching member 52 is mounted to allow communication between the exhausting end 112 and the upper turning passage 15. Simultaneously, the second driving roller 71 rotates reversely (i.e. counter-clockwise direction) to convey the document 300 from the return passage 14, through the bypass area 13 toward the flipping passage 12. When the front end of the document 300 is again sensed by the second sensing member 62 and the movement thereof is delayed for a period of time, the scanning unit 210 is activated to complete scanning of the second surface 320. After the second surface 320 of the document 300 is scanned, the document 300 is conveyed through the exhausting end 112 and the guiding passage 53 to the upper turning passage 15, and the rotation of the second driving roller 71 and the lower driven roller 73 conveys the document 300 to the return space 17 (as shown by dotted line in FIG. 5), wherein the second surface 320 of the document 300 is facing downward and the first surface 310 of the document 300 is facing upward).

Figure 6:
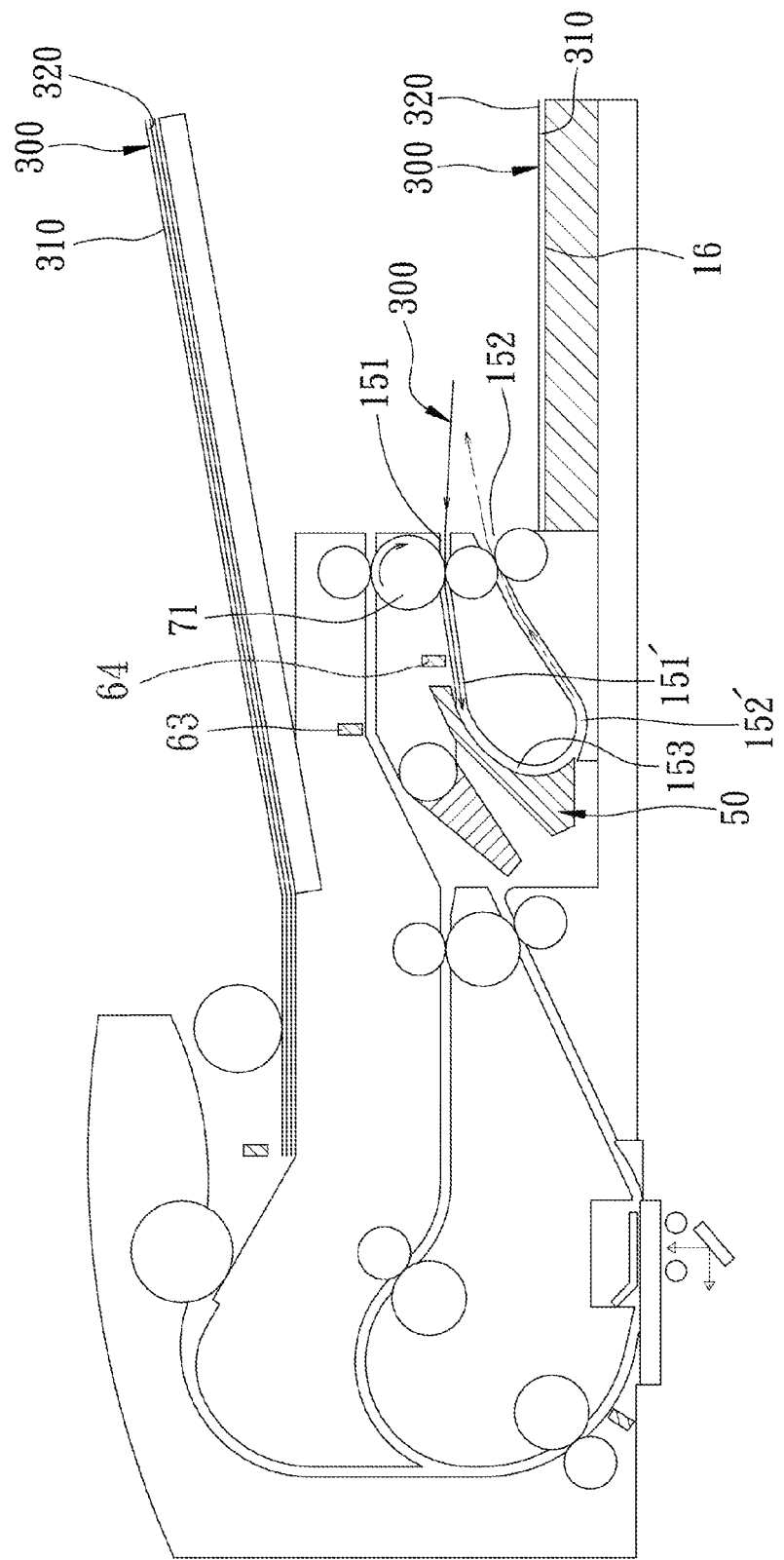
FIG. 6 is a schematic view of the switching unit showing the switching unit switched from the second position to a first position to accomplish the ejection of the document sheets according to the embodiment of the invention.

As shown in FIG. 6, when the fourth sensing member 64 senses the front end of the document 300, the switching unit 50 is moved from the second position to the first position, and the second driving roller 71 rotates clockwise, such that the document 300 is guided from the first internal end 151' into the curving path 153. Finally, the document 300 is ejected from the lower turning passage 150 and placed on the ejecting tray 16. At this time, the first surface 310 of the document 300 is facing downward, and the second surface 320 is facing upward. As a result, the document 300 is arranged from bottom to top, of which the original sequence is therefore maintained.

Therefore, the document feeding device of the invention accomplishes double-sided scanning and reverts the document 300 back to an original sequence. Following advantageous may be made.

First, the upper and lower turning passages 15, 150 are utilized to separate the delivery passage 11 and the flipping passage 12, such that the next sheet of the document 300 is able to enter the document feeding device to be scanned while the previous sheet of the document 300 is not completely ejected out of the lower turning passage 150. Thus, scanning speed is increased, and the overall size of the document feeding device is maintained due to the small-sized upper and lower turning passages 15, 150.

Second, by switching the switching unit 50 between the first and second positions, and utilizing the disposition of the upper and lower turning passages 15, 150, the scanned document 300 is able to be maintained an original sequence. Additionally, the structure is simplified, assembly is convenient, and manufacturing cost is decreased.

Further, when the document feeding device is applied to process single-sided scanning, as shown in FIG. 2, the switching unit 50 is kept in the first position. The document 300 enters through the delivery passage 11 and is scanned therein. The first switching member 51 is mounted to allow communication between the exhausting end 112 and the return passage 14, such that the scanned document 300 is conveyed from the delivery passage 11, through the bypass area 13 and finally out from the outer end 142 of the return passage 14 to the ejecting tray 16.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A document feeding device for handling and reverting double-sided document sheets to an original sequence, comprising:

a housing unit comprising a delivery passage, a flipping passage connected to the delivery passage, a bypass area on a side of the delivery passage and the flipping passage, a return passage on a side of the bypass area, an upper turning passage, and a lower turning passage, wherein the delivery passage has a feeding end, an exhausting end below the feeding end, and a scanning section between the feeding end and the exhausting end, the flipping passage has a guiding inlet corresponding to the exhausting end and a guiding outlet connected to the delivery passage, the return passage has an inner end corresponding to the guiding inlet, and an outer end opposite to the inner end, the upper turning passage, adjacent to a side of the bypass area, has a first internal end corresponding to the exhausting end and a first external end opposite to the first internal end, and the lower turning passage has a second external end corresponding to the first external end and a second internal end opposite to the second external end; and a switching unit, pivotally disposed in the bypass area, comprising a first switching member, a second switching member connecting to a side of the first switching member, and a guiding passage between the first switching member and the second switching member, wherein the second switching member has a curved guiding surface opposite to the guiding passage, and when the switching unit is in a first position, the first switching member is mounted to allow communication between the exhausting end and the return passage, the second switching member moves close to the upper and lower turning passages, and the curved guiding surface is located between the first and second internal ends to form a curving path communicating the upper turning passage with the lower turning passage, and when the switching unit is in a second position, the first switching member is mounted to allow communication between the guiding inlet and the return passage, and the second switching is mounted to allow communication between the exhausting end and the upper turning passage.

2. The document feeding device as claimed in claim 1, wherein the housing unit further comprises an ejecting tray on exterior of the second external end of the lower turning passage and a return space above the ejecting tray.

3. The document feeding device as claimed in claim 1, further comprising a feeding roller assembly, a moving roller assembly disposed in the delivery passage between the feeding end and the exhausting end, an exhausting roller assembly disposed at the guiding inlet and the exhausting end, and a return roller assembly disposed at the upper and lower turning passages.

4. The document feeding device as claimed in claim 3, wherein the exhausting roller assembly comprises a first driving roller, a first driven roller and a second driven roller, the first and second rollers are disposed on two sides of the first driving roller corresponding to the exhausting end and the guiding inlet, respectively, and the first and second driven rollers are driven by the first driving roller to rotate relatively to the first driving roller.

5. The document feeding device as claimed in claim 4, wherein the return roller assembly comprises a second driving roller, an upper driven roller, a lower driven roller and a guiding roller corresponding to the lower driven roller, the upper and lower rollers are disposed on two sides of the second driving roller corresponding to the return passage and the first external end, respectively, the upper and lower driven rollers are driven by the second driving roller to rotate relatively to the second driving roller, and the guiding roller is driven indirectly by the second driving roller to rotate relatively to the lower driven roller.

6. The document feeding device as claimed in claim 5, wherein the housing unit further comprises a protruded trapezoid end portion disposed between the guiding inlet and the exhausting end, the end portion is disposed in the bypass area and comprises a plurality of guiding pieces, and the first switching member of the switching unit comprises a plurality of protrusions arranged in alternate with the guiding pieces.

7. The document feeding device as claimed in claim 1, further comprising a sensing unit, wherein the sensing unit comprises a first sensing member corresponding to the feeding end, a second sensing member disposed in the scanning section, a third sensing member in the return passage and a fourth sensing member in the first internal end.

* * * * *